United States Patent
Pathak et al.

(10) Patent No.: US 11,924,302 B2
(45) Date of Patent: *Mar. 5, 2024

(54) MEDIA PLAYER FOR RECEIVING MEDIA CONTENT FROM A REMOTE SERVER

(71) Applicant: NAGRAVISION S.A., Cheseaux-sur-Lausanne (CH)

(72) Inventors: Aditee Anil Pathak, Bangalore (IN); Philippe Stransky, Cheseaux-sur-Lausanne (CH); Gyanveer Singh, Jahangirpur Sham (IN)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 43 days.

This patent is subject to a terminal disclaimer.

(21) Appl. No.: 17/531,152

(22) Filed: Nov. 19, 2021

(65) Prior Publication Data

US 2022/0159088 A1      May 19, 2022

Related U.S. Application Data

(63) Continuation of application No. 16/596,294, filed on Oct. 8, 2019, now Pat. No. 11,212,357, which is a (Continued)

(30) Foreign Application Priority Data

May 7, 2013 (EP) .................................. 13166886

(51) Int. Cl.
*G06F 15/16* (2006.01)
*H04L 65/60* (2022.01)
(Continued)

(52) U.S. Cl.
CPC ............ *H04L 67/565* (2022.05); *H04L 65/60* (2013.01); *H04L 67/1095* (2013.01);
(Continued)

(58) Field of Classification Search
CPC ... H04L 67/565; H04L 65/60; H04L 67/1095; H04L 67/303; H04L 67/306; H04L 63/0861; H04W 4/18; H04W 12/06
See application file for complete search history.

(56) References Cited

U.S. PATENT DOCUMENTS 6,072,520 A    6/2000 Yuen
6,722,984 B1   4/2004 Sweeney
(Continued)

FOREIGN PATENT DOCUMENTS

WO    2005/022910    3/2005
WO    2009/023289    2/2009

OTHER PUBLICATIONS

Wolters et al. "Loudness Normalization In The Age of Portable Music Players". May 22-25, 2010. pp. 1-17. (Year: 2010).*
(Continued)

*Primary Examiner* — Imad Hussain
(74) *Attorney, Agent, or Firm* — POLSINELLI LLP

(57) ABSTRACT

An embodiment of the present invention may be deployed in a system comprising a media player and a remote server operably connected to communicate with one another. The invention allows for a settings file to be stored on the remote server, the settings file comprising parameters useful for adjusting different settings on the media player such that rendering of a particular content to be made possible on the media player according to a user's predetermined taste by downloading the settings from the server onto the media player.

20 Claims, 1 Drawing Sheet

Related U.S. Application Data continuation of application No. 14/889,694, filed as application No. PCT/EP2014/059398 on May 7, 2014, now Pat. No. 10,476,924.

(51) Int. Cl.

| | | |
|---|---|---|
| *H04L 67/1095* | (2022.01) | |
| *H04L 67/303* | (2022.01) | |
| *H04L 67/306* | (2022.01) | |
| *H04L 67/565* | (2022.01) | |
| *H04W 4/18* | (2009.01) | |
| *H04W 12/06* | (2021.01) | |
| *H04L 9/40* | (2022.01) | |

(52) U.S. Cl.
CPC .......... *H04L 67/303* (2013.01); *H04L 67/306* (2013.01); *H04W 4/18* (2013.01); *H04W 12/06* (2013.01); *H04L 63/0861* (2013.01)

(56) References Cited

U.S. PATENT DOCUMENTS

| | | | |
|---|---|---|---|
| 8,027,518 | B2 | 9/2011 | Baker |
| 8,505,056 | B2 | 8/2013 | Arora |
| 8,608,550 | B1 | 12/2013 | Gagner |
| 8,683,532 | B2 | 3/2014 | Chen |
| 9,167,042 | B1 | 10/2015 | Erhardt |
| 9,985,846 | B1 | 5/2018 | Roman |
| 10,476,924 | B2 | 11/2019 | Pathak et al. |
| 11,212,357 | B2 | 12/2021 | Pathak et al. |
| 2002/0041236 | A1 | 4/2002 | Sakai |
| 2002/0059621 | A1 | 5/2002 | Thomas |
| 2002/0142825 | A1 | 10/2002 | Lark |
| 2003/0171863 | A1 | 9/2003 | Plumeir |
| 2004/0179736 | A1 | 9/2004 | Yin |
| 2005/0096753 | A1 | 5/2005 | Arling |
| 2005/0097618 | A1 | 5/2005 | Arling |
| 2005/0144305 | A1 | 6/2005 | Fegan |
| 2005/0159823 | A1 | 7/2005 | Hayes |
| 2007/0033634 | A1 | 2/2007 | Leurs |
| 2007/0124761 | A1 | 5/2007 | Chen |
| 2007/0209047 | A1 | 9/2007 | Hallberg |
| 2007/0220582 | A1 | 9/2007 | Hallberg |
| 2007/0283165 | A1 | 12/2007 | Milgramm |
| 2008/0020943 | A1 | 1/2008 | Anderson et al. |
| 2008/0026816 | A1 | 1/2008 | Sammon |
| 2008/0201754 | A1 | 8/2008 | Arling |
| 2008/0317292 | A1 | 12/2008 | Baker |
| 2009/0047993 | A1* | 2/2009 | Vasa .................. G11B 27/34 381/103 |
| 2009/0083281 | A1 | 3/2009 | Sarig |
| 2009/0124350 | A1 | 5/2009 | Iddings |
| 2009/0313564 | A1* | 12/2009 | Rottler ................ G11B 27/105 715/764 |
| 2010/0070089 | A1 | 3/2010 | Harrod |
| 2011/0012896 | A1 | 1/2011 | Ji |
| 2011/0154212 | A1 | 6/2011 | Gharpure et al. |
| 2011/0156998 | A1 | 6/2011 | Huang |
| 2011/0157329 | A1 | 6/2011 | Huang |
| 2011/0216175 | A1 | 9/2011 | Shimoyama |
| 2011/0225611 | A1 | 9/2011 | Shintani |
| 2011/0293113 | A1 | 12/2011 | McCarthy |
| 2012/0210354 | A1 | 8/2012 | Wong |
| 2012/0249532 | A1 | 10/2012 | Kawada |
| 2013/0094667 | A1* | 4/2013 | Millington ............... H03G 3/20 381/104 |
| 2013/0194440 | A1 | 8/2013 | Bernard |
| 2013/0204428 | A1 | 8/2013 | Steinle |
| 2013/0243199 | A1* | 9/2013 | Kallai ................ H04N 21/4307 381/17 |
| 2013/0279878 | A1 | 10/2013 | Haverkamp |
| 2014/0007154 | A1 | 1/2014 | Seibold |
| 2014/0016908 | A1 | 1/2014 | Sakaniwa |
| 2014/0040945 | A1 | 2/2014 | Gates |
| 2014/0143551 | A1 | 5/2014 | Rothschild |
| 2014/0169751 | A1 | 6/2014 | Weast |
| 2014/0173025 | A1 | 6/2014 | Killick |
| 2015/0146886 | A1* | 5/2015 | Baumgarte .......... H03G 3/3089 381/107 |
| 2015/0363160 | A1* | 12/2015 | Riedmiller ............. H04R 29/00 700/94 |
| 2016/0055857 | A1 | 2/2016 | Johnston |
| 2017/0366542 | A1 | 12/2017 | Milgramm |
| 2018/0241639 | A1 | 8/2018 | Roman |

OTHER PUBLICATIONS

International Search Report issued in International Application No. PCT/EP2014/059398 dated Sep. 3, 2014.

Written Opinion issued in International Application No. PCT/EP2014/059398 dated Sep. 3, 2014.

European Search Report dated Nov. 26, 2013 for European Patent Application No. EP 13 16 68886; 4 pages.

Non-Final Office Action dated Sep. 22, 2017 for U.S. Appl. No. 14/889,694; 15 pages.

Non-Final Office Action dated Sep. 14, 2018 for U.S. Appl. No. 14/889,694; 16 pages.

Final Office Action dated Apr. 26, 2018 for U.S. Appl. No. 14/889,694; 30 pages.

Final Office Action dated Mar. 18, 2019 for U.S. Appl. No. 14/889,694; 16 pages.

Notice of Allowance dated Jul. 17, 2019 for U.S. Appl. No. 14/889,694; 6 pages.

Non-Final Office Action dated May 26, 2021 for U.S. Appl. No. 16/596,294; 14 pages.

Notice of Allowance dated Aug. 26, 2021 for U.S. Appl. No. 16/596,294; 8 pages.

\* cited by examiner

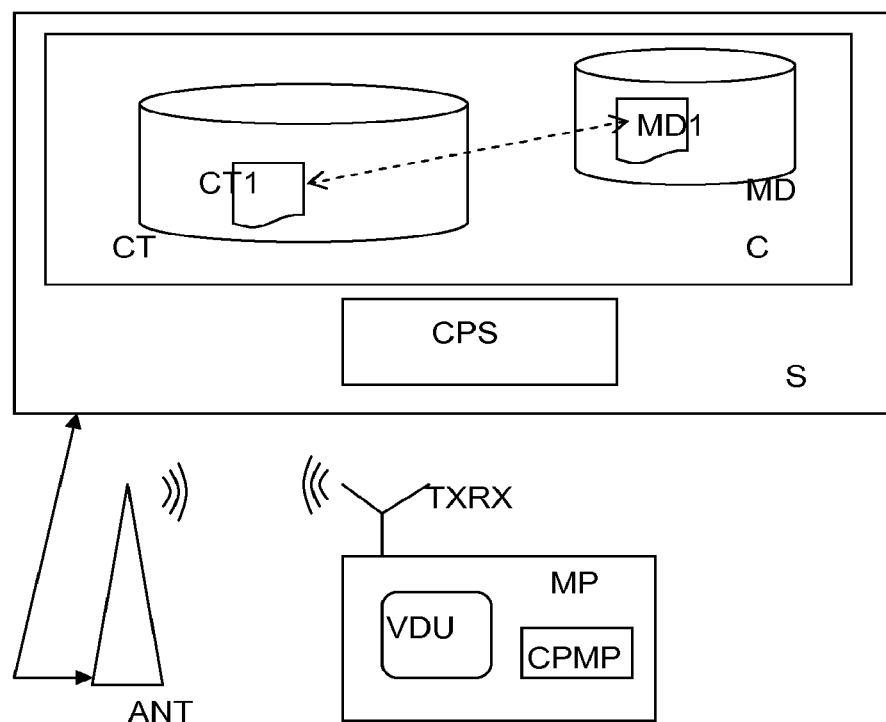

MEDIA PLAYER FOR RECEIVING MEDIA CONTENT FROM A REMOTE SERVER

CROSS-REFERENCES TO RELATED APPLICATIONS

This application is a continuation of U.S. patent application Ser. No. 16/596,294 filed Oct. 8, 2019, which is a continuation of U.S. patent application Ser. No. 14/889,694 filed Nov. 6, 2015, which is a national stage entry of PCT/EP2014/059398 filed May 7, 2014, which claims priority to European Patent Application No. 13166886.5 filed May 7, 2013, the entire contents of each which are incorporated herein by reference in their entirety for all purposes.

TECHNICAL FIELD

The present invention pertains to the domain of digital equipment programming, especially where such programming involves initialising or otherwise setting said equipment into a predetermined state.

BACKGROUND ART

U.S. Pat. No. 8,027,518 B2 discloses an architecture that can obtain biometric data from a user as the user interacts with a piece of digital equipment. Based upon the obtained biometric data, the architecture can determine an identity of the user and automatically apply settings to the piece of digital equipment, the settings being associated with the particular user. The disclosure therefore is addressed at solving a problem of automatically configuring the piece of digital equipment according to a particular user, the user being sufficiently authenticated in a convenient manner without requiring the user to perform an activity over and above the gestures he would normally make when using the equipment. Given that the field of application does not present a high incentive for piracy, then the level of authentication need not be particularly high and so authentication by biometric means, although recognised as being imperfect, is deemed to be sufficient for this application. Since the purpose of the mentioned disclosure is not for automatically setting controls of any one from a plurality of potential rendering devices such that a user may experience a particular media content according to his pre-determined preference, specific provision for achieving such benefits is not disclosed therein.

United States Patent Application Publication number 2011/0154212 A1 describes a method for providing, upon request, an augmented user interface (AUI) providing functionality to a user having a particular type of special need such a user having diminished sight faculties for example. AUI configuration information for a particular user is collected, recorded in a preference file, and sent to a remote server for storage. Upon reception of a login request by the remote server, the remote server authenticates the user, retrieves the stored preference file and sends the preference file to the computer currently being used by the user. The computer being used by the user can then configure an appropriate AUI for that user. This provides an adequate interface for the user to continue working with his computer using an interface with which he is familiar and which is adapted to his special needs.

United States Patent Application Publication number 2007/0033634 A1 is directed towards rendering a media presentation to a user in manner which is specific to that user depending on some current information regarding the user. The current information depends on a context and a pre-determined user-profile. The context is provided by context sensors, which may be movement detectors or biometric detectors for example to determine what the user is doing at that particular time. The context is interpreted using the user-profile to map to a mood or physical state of the user, thereby allowing for the rendering of the media presentation to be adjusted. Such adjustment may include timing of when an advertisement is shown or different presenters may be shown or adjustment of playback parameters of the playback device may be made (e.g. volume or brightness) or even environmental conditions may be adjusted, such as dimming the room lighting for example. In this manner, the user experience while the media presentation is being rendered can be altered depending on a profile and the viewer's current behaviour. The purpose thus achieved is therefore not one of ensuring that a particular content will be experienced according to a user's pre-determined control settings irrespective of the particular device which is being used.

United States Patent Application Publication number 2008/020943 A1 describes a content browsing apparatus and method in which a user profile and a terminal profile are stored. The user profile comprises information regarding user-preferred content, while the terminal profile comprises information related to the browsing apparatus, such as a user's preferred listening volume on that apparatus. The terminal profile is created once and is stored on the terminal (browsing apparatus). Provision is thereby made for apparatus to present the viewer with content according to the user's preferred content and the preset parameters affecting the playback of the content. This does not address the problem of accessing particular content from any device and having it played back on that device according to pre-determined settings for that content.

BRIEF DESCRIPTION OF THE INVENTION

The present invention is aimed at solving some of the problems apparent in the prior art, including the technology mentioned above. According to an embodiment of the present invention, a method is provided for giving access, using a media player, to a media content file, said access allowing for a user to experience rendering of the media content file according to a predetermined set of parameters associated with said rendering of said content. The method includes recovering, from a remote server, a pre-stored metadata file associated with the pre-stored media content, the metadata file comprising settings personalised for the user, the settings affecting parameters related to the rendering of the media content on the media player. The parameters include volume level, bass level, treble level, fader position, balance position, brightness level, colour level, contrast level among others.

According to another aspect of the present invention, there is provided a media player for performing the above method. The media player can also automatically store and synchronise preferred settings for rendering of media content files using the media player, said synchronizing taking place between the media player and a remote server.

According to yet another aspect of the present invention, provision is made for a particular file format for a metadata file comprising settings allowing for a media player to be configured either according to a user's predetermined choice or according to particular requirements of a particular media content file or file-type or according to a particular media player of media player type. According to various embodiments a combination of the settings mentioned in this paragraph may be applied.

According to one aspect of the present invention, provision is made for a media player for rendering a media content, the media player comprising processing means and configured such that at least one characteristic related to said rendering of the media content is adjustable according to a value of at least one control parameter;
characterised in that:
the media player is further configured to:
store a predetermined value of the control parameter on a server, the media content being associated with the predetermined value of the control parameter;
recover the predetermined value of the control parameter from the server; and
adjust the characteristic related to said rendering of the media content using a control setting value derived from the recovered predetermined value of the control parameter.

According to a further aspect of the present invention, there is provided a system comprising:
a media player for rendering a media content; and
a server having a remote connection to the media player;
the media player comprising processing means and configured such that at least one characteristic related to said rendering of the media content is adjustable according to a value of at least one control parameter;
characterised in that:
the media player is further configured to:
store a predetermined value of the control parameter on the server, the media content being associated with the predetermined value of the control parameter;
recover the predetermined value of the control parameter from the server; and
adjust the characteristic related to said rendering of the media content using a control setting value derived from the recovered predetermined value of the control parameter.

According to yet a further aspect of the present invention there is provided a method for rendering a media content on at least one media player, the media player configured such that at least one characteristic related to said rendering of the media content is adjustable according to a value of at least one control parameter, the method comprising:
storing a predetermined value of the control parameter on a server, the predetermined value of the control parameter being associated with the media content;
playing the media content on the media player;
recovering from the server, by the media player, the predetermined value of the control parameter associated with the media content; and
deriving a control setting value from the recovered value of the control parameter, the control setting value being used to adjust the characteristic related to said rendering of the media content.

Accordingly, there is provided a technique for automatically setting controls of any one from a plurality of potential rendering devices such that a user may experience a particular media content according to his pre-determined preference irrespective of which rendering device is being used.

BRIEF DESCRIPTION OF THE DRAWINGS

The present invention will be better understood thanks to the detailed description which follows and the accompanying drawings, which are given as non-limiting examples of embodiments of the invention, wherein:

FIG. 1 shows a system in which an embodiment of the present invention may be deployed.

DETAILED DESCRIPTION OF THE INVENTION

When using a media player to play media content, i.e. to play a media content file, a user generally has to adjust various parameters associated with the rendering of the media content file on his media player. Such parameters include listening volume, fade setting, balance setting, bass level and treble level among others. According to embodiments of the present invention there is provided a method for storing such settings in a metadata file on a remote server along with the media content file and to recover the settings in a manner which will allow any particular media player selected by the user to render the media content file according to the user's predetermined preferences. By remote server it is meant one or more storage facilities provided outwith the media player where one or more media content files may be stored. The remote storage facilities can be provided on one or more computers accessible via a network such as the Internet for example. Such remote servers may also be referred to as the Cloud. A particular user may have a Personal Cloud in that access to the content stored in the Personal Cloud is reserved to that particular user, preferably through a process including identification and authentication of the user. Advantageously the remote server is accessible by the user from a large number of geographical locations, preferably anywhere, and using any media player as long as it is capable of receiving the media content from the remote server and rendering the media content.

According to embodiments of the present invention the media player could be any from of a personal computer (otherwise known as a laptop computer or desktop computer), a personal digital assistant (PDA), a mobile telephone (particularly of a so-called Smart-phone type), a computer tablet, a mobile digital audio file player, a mobile digital video player, a set-top box, a digital television set (such as an integrated digital TV, mobile or fixed, especially one adapted for playing content from a remote server (IPTV)) or any other digital electronic device allowing for either a hardware, software or mixed hardware/software media playing function to be installed and operated.

According to a first embodiment of the present invention a media player is provided, the media player comprising a storage module upon which a media content file may be stored. The storage medium may also serve to store a metadata file comprising parameter settings useful during rendering of the media content file by the same media player or another media player. Throughout this document, the term control parameter may also be used to mean the parameter setting. The metadata file may be used to adjust various parameter settings of the media player. By adjusting the parameter settings the rendering of the media content by the media player may be altered in a way which is perceptible by the user. It can therefore also be said that the media player is configured such that at least one characteristic related to the rendering of media content is adjustable according to a value of on or more control parameters. Whereas it is not usual for control parameters, as described herein, to be associated with a piece of media content, according to embodiments of the present invention, control parameters are associated at least with a particular media content. The storage module thus provides at least temporary storage for at least the metadata file, since the media player further comprises a communication interface for storing at least the metadata file on a remote server. The communication interface must be bidirectional, thereby allowing the media player to send the metadata file to the remote server or to recover a media data file and/or its associated metadata file from the receiver, as will be seen later. According to preferred embodiments, the media content file is also stored on the server. According to some embodiments, the media content file and the metadata file are associated with each other in the sense that the settings within the metadata file are to be applied to a media player whenever that particular media content file is to be rendered. It will be recognised by the person of ordinary skill in the art that media content files may comprise audio, video or audio/video content. Settings which may be stored in the metadata file may therefore be applicable to any of the usual parameters associated with the rendering of the media content file, such as listening volume level, fade setting, balance setting, bass level and treble level, fader position, balance position, brightness level, colour level and contrast level, among others. These are otherwise known as characteristics related to the rendering of the media content. These settings and levels are parameters which affect the qualities perceived by a user during rendering of the content by the media player. To be more specific, loudness is a quality perceptible by the user, bass level is a quality perceptible by the user etc. These qualities can also be known as characteristics related to the rendering of the media content.

FIG. 1 shows an exemplary system in which an embodiment of the present invention may be deployed. A user has access to a personal cloud (C) on a remote server (S), the server having a storage module with a first storage space (CT) for one or more media content files (CT1) and a second storage space (MD) for metadata files (MD1) a metadata file (MD1) being associable with a media content file (CT1). In FIG. 1 a dotted arrow is shown between the media content file (CT1) and the metadata (MD1) file, indicating that the two files are associated with each other, meaning that a user has already chosen his settings for that particular media content file (CT1) and saved it in the metadata file (MD1) on his personal cloud (C) on the remote server (S). By personal cloud (C) it is meant a space on the server which is accessible by the user upon successful authentication. The server has processing means (CPS), which may be used for processing the metadata file (MD1). The remote server (S) has a communication link (ANT, TXRX) to a media player (MP) and as such the media player (MP) may upload or download data from the server (S). The media player has rendering device (VDU), such as a speaker or a display or a display and a speaker, for rendering the media content. The media player further comprises a processor (CPMP) which may be used for processing settings from the metadata files (MD). The bidirectional link may also be referred to as a bidirectional channel.

During operation of a media player according to any of the embodiments of the present invention, a media player stores a metadata file on a remote server, the metadata file comprising the user's preferred settings for the rendering of a particular media content file. When the same media content file is subsequently selected by the user for rendering on the same media player or another media player, the user may choose whether or not he wants to use his preferred settings for rendering of the selected media content file. In the case that the user does want to use his preferred settings, the previously stored settings associated with the selected media content file are recovered from the metadata file stored on the server and the settings are applied to the media player for the rendering of the content. The media content file may either be played from the memory module of the media player or recovered from the remote server along with the associated metadata file (by either downloading or streaming). In the case that the user decides not to use the previously stored settings, then he will configure new settings for the media player manually.

According to embodiments of the present invention the settings in the metadata file are stored in absolute form, where the actual value of the parameter setting is stored in the file. Alternatively a relative value is stored, for example in percentage terms. A 50% value for a particular setting would mean that the parameter setting was at 50% of its maximum in this case. Alternatively, both the absolute and relative values could be stored to allow for flexibility in applying the settings depending on whether or not the settings will be applied to the same media player which was used to determine the settings or a different media player. In the context of the present invention, a relative value means a value from which the actual parameter setting may be derived given the predetermined range of possible values for the media player.

If the same media player or the same type or model or manufacturer of media player is used to replay a content file, then it is simple to use just the absolute value of a setting from the metadata file to programme the media player during subsequent playing of the same content. Alternatively, if a different type of media player is used for the subsequent playing or a different manufacturer or different model, then it is advantageous to use the relative settings. An application in the server or on the media player can be executed on a processor to convert the relative value to a value which will be understood by the media player.

As mentioned above, the calculation of the required commands to be applied to the media player could be done using the processor on the remote server. Such calculations could be based on known elements relative to the media player identification in terms of type, model etc stored in a library on the server or taken directly from the media player when it connects to the server. Alternatively, it could be left for the processor on the media player itself to interpret the settings from the metadata file.

By having both relative and absolute settings recorded in the metadata file it is then easy to configure a media player of the same model as the one which was used to generate the parameter settings by simply using the absolute settings. Similarly it easy to configure a media player of a different make or model by deriving settings based on the relative settings in the metadata file.

For systems in which embodiments of the present invention are deployed where both the media content file and the metadata file are stored on the remote server, access is guaranteed even if rendering of content is required on a different device from the one which was used when storing the settings.

According to another embodiment of the present invention, the remote server storage device further comprises an area where a library of known media players is stored. This library can be updated as and when users save their settings. An application on the remote server retrieves a device identifier from a media device when it connects and stores the device's capabilities in a file pertaining to the particular device type or model. This information may also help in determining a device's maximum and minimum settings per parameter (predetermined range), which will help when the settings in a metadata file are expressed in relative terms such as in percentage value for example.

As mentioned above, the media player may be any of the known types as long as it has access to the remote server. Typically this will be an internet protocol interface capable of accessing the user's so-called private cloud on the internet. The media player, typically referred to as a client device since it is configured to connect to a server, according to an embodiment, is further configured to communicate its device type and capabilities to the server.

According to an embodiment, the server is configured to adapt the settings from the metadata file to be suitable for the particular client according to the capabilities communicated by the client to the server. For this the server has a processor to be able to translate the settings in relative terms to absolute terms using the discovered capabilities of the media player. By discover it means that the media player sends its capabilities in terms of predetermined ranges of its settings to the server at some point during a communication between the two. In another embodiment it is the client itself which is configured to extract the settings from the metadata file and to interpret the settings in an appropriate manner to be able to apply them to its own particular settings requirements. The metadata file may include all settings applicable to a large set of known clients, each client using only those settings which are applicable to it, or the server configuring those settings on the client which are applicable to that particular client. Different clients may have different settings including HD/SD, surround sound type, noise reduction type, stereo/mono, 2D/3D etc.

According to the various embodiment of the present invention discussed above, the metadata file further includes settings applicable to a media player, the settings having been predetermined by a particular user. According to another embodiment of the present invention, the settings could be predetermined with respect to a particular media player without such settings having been predetermined by a particular user but rather a set of default settings, possibly manufacturer-suggested settings applicable to the particular media player or rather media player type. A further variant of this embodiment is where the settings are related to a particular content or a particular content type. In this case the settings are predetermined according to the media content itself or the media content type itself. This is useful when the particular media content or type is best rendered when a media player is configured according to a set of settings, perhaps predetermined by the originator or author of the content. For example, a composer of a particular piece of music may suggest that the particular piece be best experienced when the piece is played at a particularly low volume for example. He could then associate the appropriate settings with his piece. Another work may be best experienced in 2D, in which case a media player having 3D capability will nonetheless render the content in 2D thanks to the predetermined settings. A particular cartoon may be best viewed with the contrast at a particularly high value, in which case such a setting may be associated with that content and included in the metadata file.

According to yet another embodiment of the present invention, which may be combined with any of the previously described embodiments, the settings in the metadata file may include values having an effect on physical parameters of the media player. By physical parameters it is meant parameters having an effect which is not necessarily limited directly to the rendering of the content but rather having an effect on the media player itself such as powering down of the media player or editing a real time clock within the media player or delaying a time of rendering of the content or changing channel for example. These functions, which do not simply have an effect on the quality of the rendering of the content perceived by the user, shall be known as physical functions of the media player.

According to another embodiment of the present invention, where the settings in the metadata file are at least associated with at least one user, the media player further comprises a biometric sensor to measure at least one biometric characteristic of the user. This measurement is then used (either by a processor in the media player or by a processor on the server) to identify the user and then to impose a predetermined set of settings applicable during the rendering of the content for that user. For example, this would be the case when the media player further comprises a sensor configured to detect at least one biometric parameter of the user, and further configured to use the biometric parameter to affect the rendering of the media content file. For example, the media player may be operably connected to a camera configured to detect the distance between the user's eyes. Given that the inter-ocular distance between an adult's eyes is greater than that between a child's eyes, such a measurement, made thanks to the camera and a processor configured to calculate the inter-ocular distance for the user, may be included as a parameter in the metadata file to set the media player to prevent playing of a particular content or content type should the inter-ocular distance fall below a predetermined threshold.

The embodiment mentioned in the paragraph above may be adapted to allow for parental control, whereby if the media player detects that a child is watching the content, then any of the known limitations can be applied, such as limiting the listening volume or limiting the time which the user can spend viewing the content. In this case the media player further comprises a clock at least for measuring playing time of a piece of content. For media players comprising a clock configured to measure time of day, then the volume could be limited when content is watched later than a predetermined time of day. In these embodiments the processor in the media player can monitor the necessary parameters (time, inter-ocular distance etc) and adjust the settings in the metadata file as a function of the readings from the clock and/or the biometric sensor when the metadata file is downloaded from the remote server. Alternatively it could be the server which is configured to edit the settings before editing the settings in the metadata file and transmitting the metadata file to the media player. Any of the known transmission methods may be used to transmitting the settings to the media player although in a preferred embodiment such transmission is via the bidirectional communication channel which exists between the communication interface of the media player and the remote server.

In a particular embodiment of the present invention where the media player is configured to be able to render the media content in 3D, the media player may be further configured to detect whether or not the user is wearing 3D glasses and to edit the settings in any of the ways mentioned previously to force the media player to render the content either in 2D or 3D according to whether or not the user is wearing the 3D glasses.

Embodiments of the present invention allow for a user to save a number of parameters associated with playback of a media content file or parameters otherwise affecting a media player during playback of a particular media content file. Such parameters are usually those chosen or otherwise previously set by the user and are saved on a remote server within a metadata file associated with the particular media content file. In this manner the user advantageously has access to his chosen settings any time he plays the media content file. The user may further share the settings with another user so that the other user can also enjoy the experience afforded by the use of the saved settings during playback of the media content file. According to a particular embodiment, a general set of settings can be saved in a metadata file on the remote server, where the general set of settings is not particularly associated with any one piece of media content but rather is one user's settings for a particular media player or type of media player or model of media player.

The metadata file comprising the settings (settings for example) may have any of the known formats for machine-readable or human-readable computer files as long as the format is suitable to be properly interpreted by the media player. Known formats for the settings file include simple ASCII text files or script files such as java, peri or php for example. Mark-up language file formats may also be used, including for example XML files, XrML files or HTML files.

According to yet another embodiment, the settings comprised in the metadata file on the remote server may further include the user's favourite in terms of a preferred composer, a preferred film director, a preferred interpreter, a preferred musical style or a preferred film genre for example. In this way, if the media player obtains access to a media library, such as a media server or a library on a hard disk, then by downloading the user's settings from the metadata file on the remote server, the media player can extract the user's favourites and scan the library for media content which corresponds to the user's services and propose the content found to the user. The favourites may of course be direct references to particular content rather then just a genre. For example the favourites may include the title of a particular film or piece of music.

An example of an embodiment of the present invention in use would be a user who decides to watch a particular film which is stored in his private cloud (i.e. on a remote server giving restricted access to the user) switches on his TV, connects to his private cloud and authenticated himself. Any of the known means of authentication are possible, such as a username and a PIN or a username and a password or any of the known authentications via biometric techniques for example. A system in which the embodiment of the invention is deployed may further comprise a conditional access module known in the domain of Pay-TV in order to perform any of the known cryptographic authentication techniques. Once successfully authenticated, the user browses through the data available on his cloud, i.e. the media content files thereon, and selects one for rendering (viewing in the case of a film or listening in the case of audio content such as a music file). The user downloads a copy of the film to his TV or streams a copy of the film to his TV and begins watching it. He adjusts the brightness, colour, volume, and bass and sets the player to render the audio part of the content in stereo. When the user has finished watching, the player saves the settings that were used to play the film in a metadata file and stores the metadata file on the user's cloud and associates the metadata file to the media content file which has the film. At some point in the future the user decides to watch the same film again. He authenticates himself again and watches the film again on his TV, this time directly using the settings that he last used thanks to having also downloaded the settings from the metadata file associated with the film. Alternatively, if he chose to access the film from his mobile phone while traveling, thanks to the fact that the settings are also stored in relative values as well as or instead of absolute values, then the new media player, which is the mobile phone, is able to reproduce the same settings that were previously used on the TV. The translation of the relative values to values required for the new media player may be carried out by an appropriate processor on the remote server (cloud) or alternatively may be carried out by an appropriate processor comprised in the media player. The processor (either remote or local) may also take care of properly interpreting certain settings and either ignoring them where a certain setting is not applicable or interpreting them where a particular setting has a different meaning or has otherwise to be deduced.

Another example of the embodiment of the present invention in use would be similar to the above except that after the user watches the film for the first time and saves the settings on the cloud, he goes to his friend's house to watch the same movie with his friend on his friend's TV. An application is available on the cloud, configured to interpret metadata files and to translate the settings therein from being suitable from a first media player model to being suitable for a second media player model. The user decides to share his settings with his friend. The user accesses his cloud, runs the application to translate his settings for his TV to be compatible with the settings required by his friend's TV to create a second metadata file and designates the second metadata file as being shareable with his friend. His friend then recovers the settings from the second metadata file and applies them to his TV while watching the film with the user.

Accordingly, there is provided a technique for automatically setting controls of any one from a plurality of potential rendering devices such that a user may experience a particular media content according to his pre-determined preference irrespective of which rendering device is being used. Pre-determined preferences are associated at least with the content to be rendered and may be recovered in a secure way from a server following appropriate authentication.

What is claimed is:

1. A method comprising:
   determining a first value of at least one control parameter, the first value associated with rendering a media content on a first media player;
   storing the first value of the at least one control parameter as a second value of the at least one control parameter in a metadata file, the second value based on the first value;
   providing a second media player with access to the metadata file comprising the second value of the at least one control parameter;
   causing the second media player to determine a third value using at least the second value of the at least one control parameter from the metadata file, the third value being different from the second value and used to control a characteristic related to rendering of the media content on the second media player; and
   causing the second media player to play the media content using the third value.

2. The method according to claim 1, further comprising: determining the first value of the at least one control parameter based at least on control parameter values while rendering the media content on the first media player.

3. The method according to claim 1, further comprising: determining the first value of the at least one control parameter based at least on a biometric characteristic of a user measured by a biometric sensor.

4. The method according to claim 1, the third value being equal to the first value of the at least one control parameter.

5. The method according to claim 1, the third value being proportional to the first value of the at least one control parameter.

6. The method according to claim 1, wherein the characteristic related to rendering of the media content is selected from at least one of volume level, fade setting, balance setting, bass level, treble level, fader position, balance position, brightness level, color level or contrast level.

7. The method according to claim 1, wherein the third value reproduces a same characteristic on the second media player as a characteristic on the first media player.

8. The method according to claim 1, wherein the second media player further comprises a clock configured to measure time of day, and wherein the determination of the third value includes performing a check of whether the time of day is later than a predetermined time of day, an adjustment being a reduction in volume if the check is positive.

9. The method according to claim 1, wherein the second media player further comprises a clock configured to limit a time which a user can spend viewing the media content and a camera to detect an inter-ocular distance of the user and determine whether the user is a child, an adjustment being a limit to an amount of time that playing of media content lasts.

10. The method according to claim 1, further comprising:
storing the media content in a first storage space associated with a user; and
storing the metadata file in a second storage space associated with the user.

11. A system comprising:
a first media player controlled by a first processor, configured for rendering a media content according to a first value of at least one control parameter;
a second media player controlled by a second processor, configured for rendering the media content according to a third value; and
metadata storage configured to:
connect to the first media player and the second media player; and
store the first value of the at least one control parameter as a second value of the at least one control parameter in a metadata file, the second value based on the first value;
wherein the second media player is further configured to:
access the metadata file to receive the second value of the at least one control parameter;
determine a third value using at least the second value of the at least one control parameter from the metadata file, the third value being different from the second value and used to control a characteristic related to rendering of the media content; and
render the media content using at least the third value.

12. The system according to claim 11, wherein determining the first value of the at least one control parameter is based at least on control parameter values while rendering the media content on the first media player.

13. The system according to claim 11, further comprising a biometric sensor, wherein determining the first value of the at least one control parameter is based at least on a biometric characteristic of a user measured by the biometric sensor.

14. The system according to claim 11, wherein the third value is equal to the first value of the at least one control parameter.

15. The system according to claim 11, wherein the third value is proportional to the first value of the at least one control parameter.

16. The system according to claim 11, wherein the characteristic related to rendering of the media content is selected from at least one of volume level, fade setting, balance setting, bass level, treble level, fader position, balance position, brightness level, color level or contrast level.

17. The system according to claim 11, wherein the third value reproduces a same characteristic on the second media player as a characteristic on the first media player.

18. The system according to claim 11, wherein the second media player further comprises a clock configured to measure time of day, wherein the determination of the third value includes performing a check of whether the time of day is later than a predetermined time of day, an adjustment being a reduction in volume if the check is positive.

19. The system according to claim 11, wherein the second media player further comprises a clock configured to limit a time which a user can spend viewing the media content and a camera to detect an inter-ocular distance of the user and determine whether the user is a child, an adjustment being a limit to an amount of time that playing of media content lasts.

20. The system according to claim 11, wherein the media content is stored in a first storage space associated with a user, and the metadata storage is a second storage space associated with the user.

* * * * *